United States Patent
Terada

(10) Patent No.: US 11,909,913 B2
(45) Date of Patent: Feb. 20, 2024

(54) NUISANCE CALL COUNTERMEASURE APPARATUS, METHOD AND PROGRAM

(71) Applicant: Nippon Telegraph and Telephone Corporation, Tokyo (JP)

(72) Inventor: Kenji Terada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 81 days.

(21) Appl. No.: 17/786,649

(22) PCT Filed: Jan. 7, 2020

(86) PCT No.: PCT/JP2020/000143
§ 371 (c)(1),
(2) Date: Jun. 17, 2022

(87) PCT Pub. No.: WO2021/140560
PCT Pub. Date: Jul. 15, 2021

(65) Prior Publication Data
US 2023/0043391 A1    Feb. 9, 2023

(51) Int. Cl.
H04M 3/436 (2006.01)
(52) U.S. Cl.
CPC .................. *H04M 3/436* (2013.01)
(58) Field of Classification Search
None
See application file for complete search history.

(56) References Cited

U.S. PATENT DOCUMENTS

| | | | | |
|---|---|---|---|---|
| 5,568,541 | A * | 10/1996 | Greene | H04M 15/00 379/140 |
| 6,353,663 | B1 * | 3/2002 | Stevens | H04M 15/68 455/406 |
| 6,650,742 | B1 * | 11/2003 | Elliott | H04M 15/06 379/114.05 |
| 2001/0021647 | A1 * | 9/2001 | Kondo | H04M 15/46 455/406 |

(Continued)

OTHER PUBLICATIONS

Rebahi et al., "SIP Spam Detection," ICDT '06, Aug. 2006, retrieved from URL <https://ieeexplore.ieee.org/stamp/stamp.jsp?tp=&arnumber=16985151>, 6 pages.

*Primary Examiner* — Harry S Hong
(74) *Attorney, Agent, or Firm* — Fish & Richardson P.C.

(57) ABSTRACT

A spam call prevention apparatus 11 includes:
  a response unit 111 configured to convey, to a phone terminal of a sender of a call, a response that, in a case where the call from the sender is evaluated as a spam or a fraud by a receiver of the call, the sender is billed a sum of money corresponding to a probability of being evaluated as the spam or the fraud;
  a notification unit 112 configured to notify, when the sender has requested, in responding to the response, the call to the receiver, a phone terminal of the receiver of a request for returning an evaluation result of evaluating the call from the sender after the call between the sender and the receiver has ended; and
  a determination unit 114 configured to determine, when the call from the sender has been evaluated as the spam or the fraud in the evaluation result, the sum of money corresponding to the probability of being evaluated as the spam or the fraud, as a sum of billing.

15 Claims, 4 Drawing Sheets

(56) References Cited

U.S. PATENT DOCUMENTS

2004/0030594 A1\* 2/2004 Berczik .............. G06Q 30/0215
705/14.19
2004/0266413 A1\* 12/2004 Bronstein ........... H04M 3/2281
455/414.1
2019/0166128 A1\* 5/2019 Kurian ................ H04L 63/0853

\* cited by examiner

NUISANCE CALL COUNTERMEASURE APPARATUS, METHOD AND PROGRAM

CROSS-REFERENCE TO RELATED APPLICATIONS

This application is a National Stage application under 35 U.S.C. § 371 of International Application No. PCT/JP2020/000143, having an International Filing Date of Jan. 7, 2020. The disclosure of the prior application is considered part of the disclosure of this application, and is incorporated in its entirety into this application.

TECHNICAL FIELD

The present invention relates to a spam call prevention apparatus, a spam call prevention method, and a spam call prevention program.

BACKGROUND ART

There has been studied prevention for spam calls for communication frauds and the like in the related art. NPL 1 discloses in "III. CHARGING BASED TECHNIQUE" a technique configured to: tell a sender of a call to be billed one dollar when the call from the sender is evaluated by the receiver of the call as a spam; and tell the receiver, when evaluating the call from the sender as the spam, to press key 8 before ending the call, and tell the receiver, when not evaluating the call as the spam, to press key 9.

CITATION LIST

Non Patent Literature

NPL 1: Y. Rebahi, and four others, "SIP Spam Detection", ICDT '06, IEEE, August 2006, <URL: https://ieeexplore.ieee.org/stamp/stamp.jsp?TP=&arnumber=16985151>

SUMMARY OF THE INVENTION

Technical Problem

However, billing one dollar is not effective enough to prevent spam calls. Further, in the middle of the call, the receiver who agrees to a contract may be talked into pressing the key 9 such that the call is not to be evaluated as the spam call.

The present invention has been made in view of the above circumstances, and an object of the present invention is to provide a technique configured to prevent spam calls or fraud calls.

Means for Solving the Problem

An aspect of the present invention is a spam call prevention apparatus including: a response unit configured to convey, to a phone terminal of a sender of a call, a response that, in a case where the call from the sender is evaluated as a spam or a fraud by a receiver of the call, the sender is billed a sum of money corresponding to a probability of being evaluated as the spam or the fraud;
a notification unit configured to notify, when the sender has requested, in responding to the response, the call to the receiver, a phone terminal of the receiver of a request for returning an evaluation result of evaluating the call from the sender after the call between the sender and the receiver has ended; and
a determination unit configured to determine, when the call from the sender has been evaluated as the spam or the fraud in the evaluation result, the sum of money corresponding to the probability of being evaluated as the spam or the fraud, as a sum of billing.

An aspect of the present invention is a spam call prevention method performed by a spam call prevention apparatus, the spam call prevention method including:
by the spam call prevention apparatus, conveying, to a phone terminal of a sender of a call, a response that, in a case where the call from the sender is evaluated as a spam or a fraud by a receiver of the call, the sender is billed a sum of money corresponding to a probability of being evaluated as the spam or the fraud;
by the spam call prevention apparatus, notifying, when the sender has requested, in responding to the response, the call to the receiver, a phone terminal of the receiver of a request for returning an evaluation result of evaluating the call from the sender after the call between the sender and the receiver has ended; and
by the spam call prevention apparatus, determining, when the call from the sender has been evaluated as the spam or the fraud in the evaluation result, the sum of money corresponding to the probability of being evaluated as the spam or the fraud, as a sum of billing.

An aspect of the present invention is a spam call prevention program for causing a computer to operate as the spam call prevention apparatus.

Effects of the Invention

The present invention provides a technique configured to prevent spam calls or fraud calls.

DESCRIPTION OF EMBODIMENTS

Figure 1:
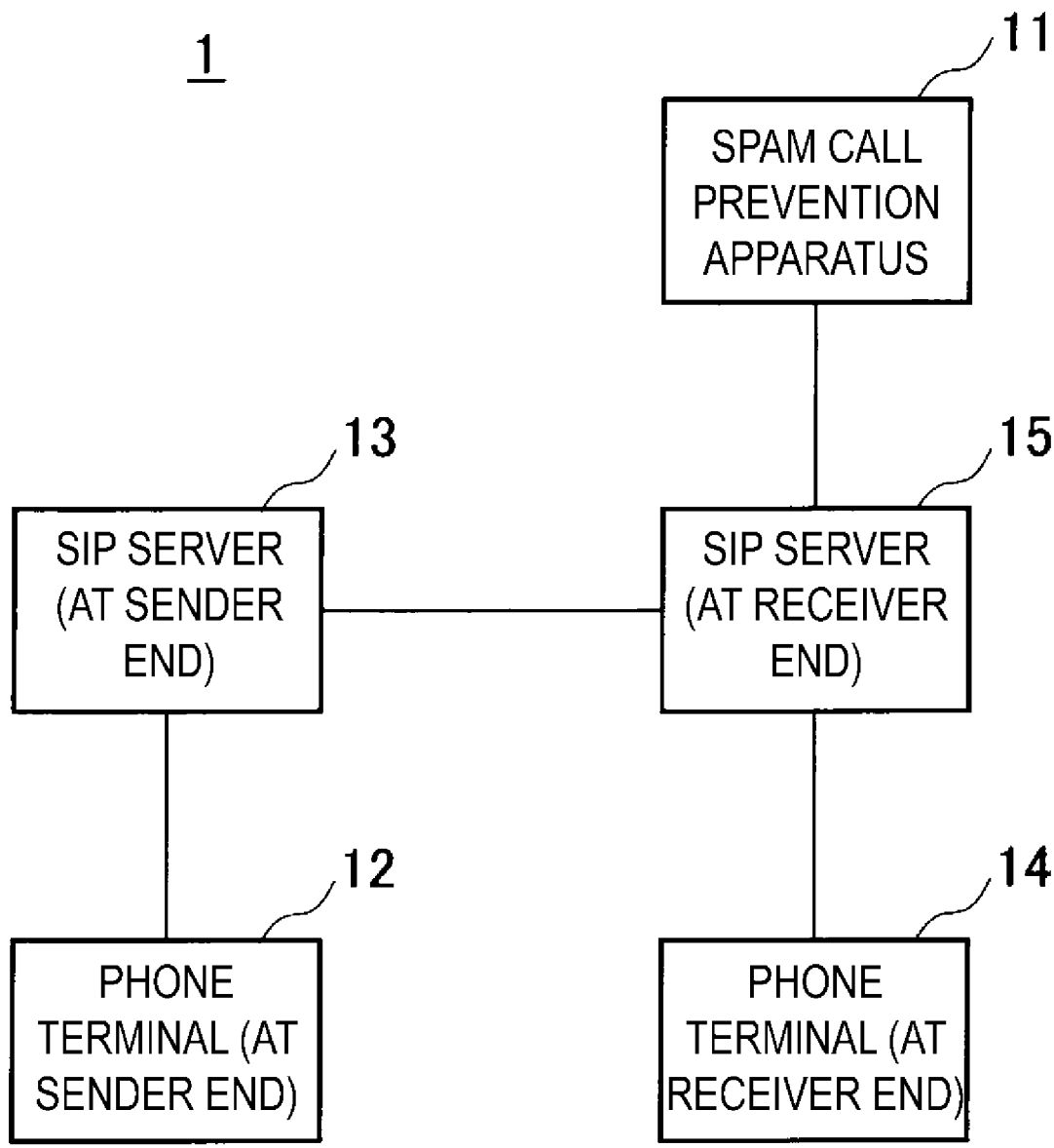
FIG. 1 is a diagram illustrating an overall configuration of a spam call prevention system.

Hereinafter, an embodiment of the present invention will be described with reference to the drawings. Note that the same portions in the description of the drawings will be denoted by the same reference numerals and signs, and the description thereof will be omitted.

SUMMARY OF THE INVENTION

In the present invention, an evaluation of details of a call or a risk related to a sender of the call is converted to a sum of money that is an indicator that is easy to understand for a receiver of the call. Here, in the present invention, the sum of billing is not low or fixed (one dollar) as in the related art and is determined based on a probability of being evaluated as a spam or a fraud.

Additionally, in the present invention, whether to place a call or not is determined not by the receiver who receives a spam call or a fraud call and tends to have a relatively low level of information literacy, but by the sender (particularly, a fraudster) who frequently places a call and tends to have a relatively high level of information literacy. More specifically, in the present invention, a response is conveyed to the sender that the sender is billed the sum of money corresponding to a probability of being evaluated as a spam or a fraud, and when the sender requests, in responding to the response, the call to the receiver, the sum of billing is determined. Here, in the present invention, not in the middle of the call as in the related art, but after the call between the sender and the receiver has ended, the receiver is notified of a request for returning an evaluation result of evaluating the call from the sender.

For example, in the present invention, when the sender places the call, a risk analysis related to an ID of the sender is performed based on, for example, header information such as the ID of the sender, a history of calls from the sender, and the evaluation related to the ID of the sender, and the sum of money to be billed to the sender is determined. Then, the sender is notified of the billing when the call from the sender is evaluated as the spam or the fraud by the receiver, and concurrently, the receiver is caused to input the evaluation of the call after the call has ended. With this configuration, when the risk is higher, the sum of billing is determined to be greater. Thus, it is possible to more effectively prevent the senders from placing the spam calls. Besides, unfair profits are not made from the receivers, and accurate evaluations are expected from the receivers. With the sum of billing collected from the senders, it is possible for a phone company to provide improved and enhanced services, leading to further increase of the services.

Overall Configuration of Spam Call Prevention System

FIG. 1 is a diagram illustrating an overall configuration of a spam call prevention system 1 according to this embodiment. The spam call prevention system 1 can be achieved by using an existing phone communication network run by the phone company. The spam call prevention system 1 includes, for example, a spam call prevention apparatus 11, a phone terminal 12 at a sender end of a call, a session initiation protocol (SIP) server 13 at the sender end, a phone terminal 14 at a receiver end of the call, and an SIP server 15 at the receiver end.

The spam call prevention apparatus 11 is physically and electrically connected to the SIP server 15 at the receiver end in a communicable manner. The spam call prevention apparatus 11 can be achieved by a computer including a CPU, a memory, a communication interface, and the like, and is included in the computer.

Examples of the phone terminal 12 at the sender end and the phone terminal 14 at the receiver end include a smart phone terminal, a tablet terminal, and a cellular phone including functions such as a voice speech function, a short message service (SMS) function, an email function, a web browser function, a data input function, a data display function, a wireless communication function, and a wired communication function.

Each of the SIP server 13 at the sender end and the SIP server 15 at the receiver end corresponds to a call processing server configured to connect the calls between the phone terminals at the sender end and at the receiver end via the existing phone communication network run by the phone company.

Configuration of Spam Call Prevention Apparatus

Figure 2:
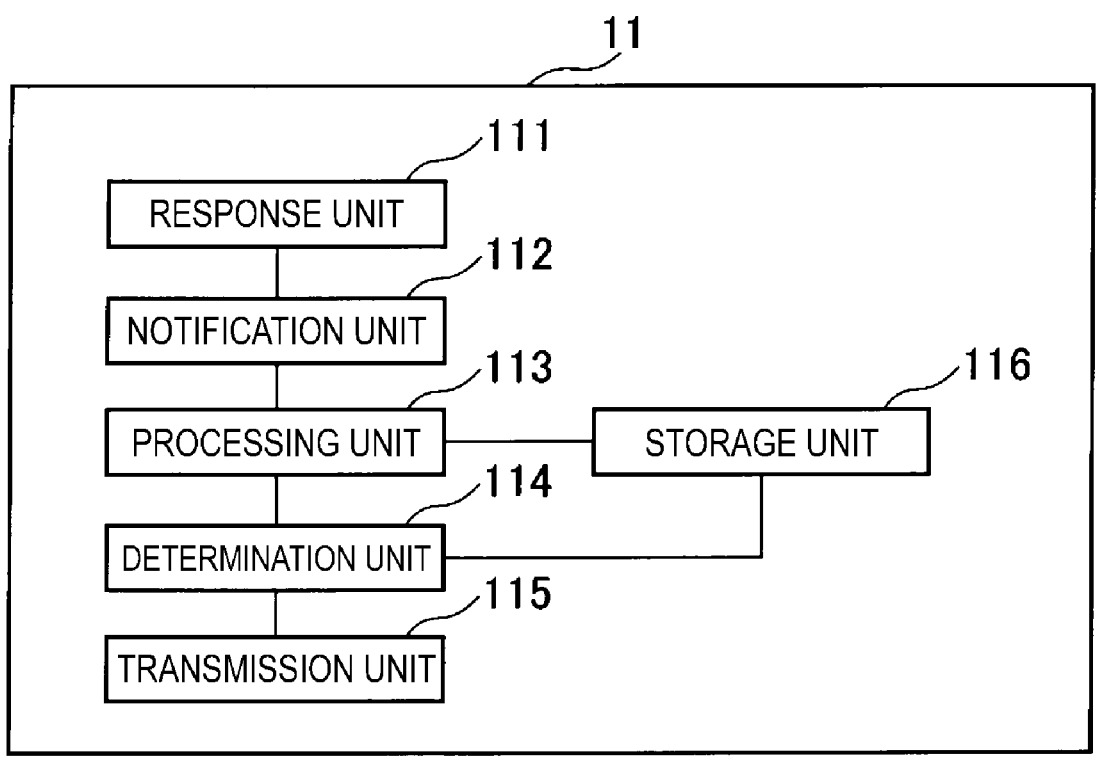
FIG. 2 is a diagram illustrating a configuration of a spam call prevention apparatus.

FIG. 2 is a diagram illustrating a configuration of the spam call prevention apparatus 11 according to this embodiment. The spam call prevention apparatus 11 includes, for example, a response unit 111, a notification unit 112, a processing unit 113, a determination unit 114, a transmission unit 115, and a storage unit 116.

The response unit 111 has a function to convey, to the phone terminal 12 at the sender end, a response that, in a case where the call from the sender is evaluated as a spam or a fraud by the receiver of the call, the sender is billed a sum of money corresponding to a probability of being evaluated as the spam or the fraud.

The notification unit 112 has a function to notify, when the sender of the call has requested, in responding to the response, the call to the receiver, the phone terminal 14 at the receiver end of a request for returning an evaluation result of evaluating the call from the sender after the call between the sender and the receiver has ended.

The processing unit 113 has a function to store the evaluation result from the receiver end in the storage unit 116. For example, the processing unit 113 performs data-processing (data analysis) of accumulating, for each sender ID and for each receiver ID, the evaluation results from the receiver, such as the spam, the fraud, or the normal. Note that, the ID corresponds to a phone number of the phone terminal.

The determination unit 114 has a function, when the call from the sender is evaluated as the spam or the fraud in the evaluation result from the receiver, to determine, as a sum of billing, the sum of money corresponding to the probability of being evaluated as the spam or the fraud, by referring to the following: the evaluation result data from the receiver stored in the storage unit 116; data for a sum of damage caused to the receiver or data for a cost of issuing the ID of the sender, which are set in advance in the storage unit 116; a history of calls stored in the storage unit 116; or various other data that has been inputted in the spam call prevention apparatus 11 or acquired by the spam call prevention apparatus 11 from other servers.

The transmission unit 115 has a function to transmit the sum of billing determined, together with the ID of the sender, to the SIP server 15 at the receiver end, a billing server, and the like.

The storage unit 116 has a function to receive the evaluation result data representing the evaluation result returned from the receiver, the data for the sum of damage caused to the receiver, the data for the cost of issuing the ID of the sender, the history of calls, and others for the purpose of determining the sum of billing. Then, the storage unit 116 stores various data which has been data-processed as needed in a readable manner.

Processing of Spam Call Prevention System

Figure 3:
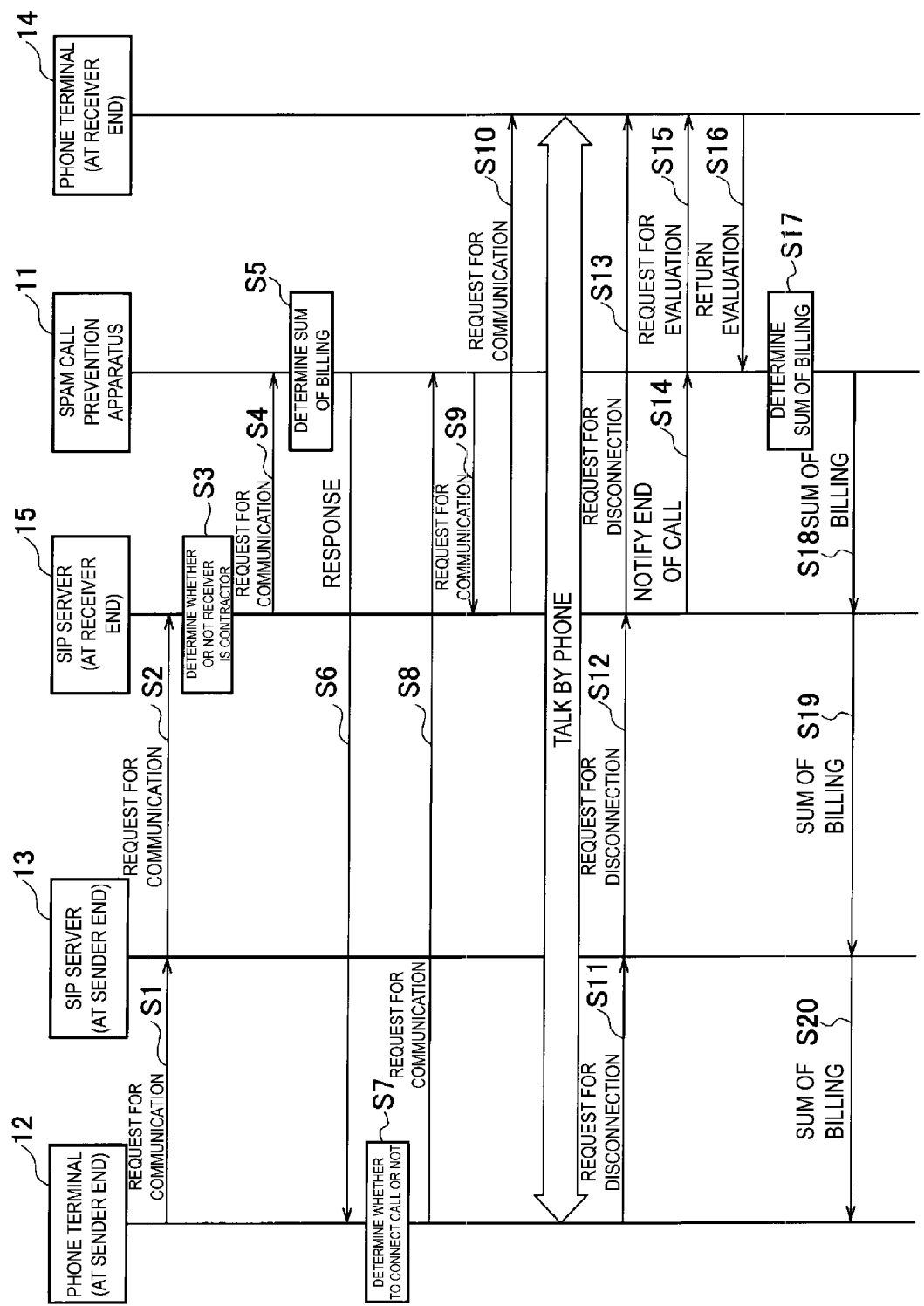
FIG. 3 is a diagram illustrating a processing sequence in the spam call prevention system.

FIG. 3 is a diagram illustrating a processing sequence in the spam call prevention system 1.

Steps S1 to S2

The sender of the call (fraudster) sends a call to the target receiver to commit a fraud. In this case, the phone terminal 12 at the sender end transmits a request for communication to the SIP server 13 at the sender end, and the SIP server 13 at the sender end routes the request for communication to the SIP server 15 at the receiver end.

Steps S3 to S4

The SIP server 15 at the receiver end refers to the ID of the receiver included in the request for communication, and determines whether or not the ID of the receiver is included in a contractor list for a spam call prevention service. When the ID of the receiver is included in the contractor list for the spam call prevention service, the SIP server 15 at the receiver end routes the request for communication to the spam call prevention apparatus 11. On the other hand, when the ID of the receiver is not included in the contractor list for the spam call prevention service, the SIP server 15 at the receiver end routes the request for communication to the phone terminal 14 at the receiver end.

Step S5

When receiving the request for communication, the spam call prevention apparatus 11 refers to the ID of the sender and the ID of the receiver included in the request for communication, and determines whether or not the ID of the sender is included in a white list related to the ID of the receiver. When the ID of the sender is not included in the white list related to the ID of the receiver, the spam call prevention apparatus 11 (determination unit 114) determines a possible sum of money to be billed to the sender. For example, the spam call prevention apparatus 11 determines, not a low and fixed sum of billing (one dollar) as in the related art, but the sum of money corresponding to the probability that the receiver evaluates the call from the sender as the spam or the fraud. A method for determining the sum of money will be described below. On the other hand, when the ID of the sender is included in the white list related to the ID of the receiver, the spam call prevention apparatus 11 returns the request for communication to the SIP server 15 at the receiver end.

Step S6

When the sum of billing is determined in the step S5, the spam call prevention apparatus 11 (response unit 111) conveys, to the phone terminal 12 at the sender end via voice speech, the response that, in the case where the call from the sender is evaluated by the receiver as the spam or the fraud, the sender is billed the sum of billing determined in the step S5 (the sum of money corresponding to the probability of being evaluated as the spam or the fraud).

Steps S7 to S10

At this timing, the sender grasps that the sum of money corresponding to the probability of being evaluated as the spam or the fraud is to be billed to the sender when the call from the sender is evaluated by the receiver as the spam or the fraud. When the sender still requests the call to the receiver despite the sum of money to be billed, the phone terminal 12 at the sender end returns the request for communication to the spam call prevention apparatus 11. Subsequently, the spam call prevention apparatus 11 routes the request for communication to the SIP server 15 at the receiver end, and the SIP server 15 at the receiver end routes the request for communication to the phone terminal 14 at the receiver end. Consequently, the call is connected between the sender and the receiver, so that the sender and the receiver can talk by phone.

Steps S11 to S13

After the call to the receiver has ended, the phone terminal 12 at the sender end transmits a request for disconnecting the call (BYE signal) to SIP server 13 at the sender end. The SIP server 13 at the sender end routes the request for disconnection to the SIP server 15 at the receiver end, and the SIP server 15 at the receiver end routes the request for disconnection to the phone terminal 14 at the receiver end. At this timing, the call connected between the sender and the receiver is disconnected.

Steps S14 to S16

After the request for disconnection is routed to the SIP server 15 at the receiver end in the step S13, the SIP server 15 at the receiver end notifies the spam call prevention apparatus 11 that the call between the sender and the receiver has ended. When being notified that the call has ended, the spam call prevention apparatus 11 (notification unit 112) notifies the phone terminal 14 at the receiver end of a request to return the evaluation result of evaluating the call from the sender. For example, the spam call prevention apparatus 11 uses an existing SMS distribution function in the phone communication network to display a page for requesting the receiver to select whether the call from the sender is the spam, the fraud (crime), or the normal (not the spam or the fraud). This page is displayed on a display screen provided by the SMS function of the phone terminal 14 at the receiver end.

In this case, the spam call prevention apparatus 11 may additionally display a radio button for the receiver to determine a degree of the spam or select options other than the spam, the fraud, and the normal, or an input box for the receiver to determine and input the sum of billing. The spam call prevention apparatus 11 may still further display a page for requesting the receiver to select whether to bill the sender or not when the call from the sender is evaluated as the spam or the fraud. Subsequently, the phone terminal 14 at the receiver end transmits, to the spam call prevention apparatus 11, the response inputted by the receiver as the evaluation result of the call from the sender.

Step S17

When the receiver has evaluated the call from the sender as the spam or the fraud in the evaluation result, the spam call prevention apparatus 11 (determination unit 114) determines the sum of billing corresponding to the probability of being evaluated as the spam or the fraud, unlike the related art in which the sum of billing is low and fixed (one dollar). A method for determining the sum of money will be described below.

Steps S18 to S20

The spam call prevention apparatus 11 (transmission unit 115) transmits the sum of billing determined in the step S17, together with the ID of the sender, to the SIP server 15 at the receiver end. The SIP server 15 at the receiver end notifies the SIP server 13 at the sender end of the sum of billing. The SIP server 13 at the sender end transmits invoice data, where the sum of billing is described, to the phone terminal 12 at the sender end.

Method for Determining Sum of Billing

In the case where the receiver of the call evaluates the call from the sender as the spam or the fraud in the evaluation result in the steps S5 and S17, the spam call prevention apparatus 11 (determination unit 114) determines the sum of billing. The method for determining the sum of billing will be described below.

Method for Determining Sum of Billing 1

The determination unit 114 determines, as the sum of billing, p satisfying a relationship of (p×q)>r, where q represents the probability of being evaluated as the spam or the fraud, and r represents a sum of income expected from each of the spam calls or each of the fraud calls. Here, p represents the sum of money corresponding to the probability of being evaluated as the spam or the fraud. The determination unit 114 determines p satisfying the relationship of (p×q)>r, so as to reduce incentives for fraud groups to place calls to commit frauds. Note that, r, which is the data required for calculation of q, is stored in the storage unit 116.

In the method for determining the sum of billing 1, {p(ab)×q(ab)} is determined in accordance with r(ab), where a represents the sender (fraud), b represents the receiver (evaluator), and r(ab) represents an expected value of the income from the receiver b, which is internally held by the sender a.

Typically, when the sender places the fraud call in response to the sum of billing (penalty) presented, the sender is assumed to have determined that it is better to commit the fraud despite the penalty. Thus, r(ab) is greater than {p(ab)× q(ab)}. In order to cause the sender to determine not to commit the fraud (not to place the fraud call) in the case of the presented penalty, {p(ab)×q(ab)} needs to be set greater than r(ab).

Thus, the determination unit 114 determines p(ab) satisfying {p(ab)×q(ab)}>r(ab). More specifically, when the call has been placed and has been determined to be the fraud, the determination unit 114 calculates new q(ab) (hereinafter, referred to as "q(ab)+1") based on the determination, and concurrently, increases {p(ab)+1} to be greater than {p(ab)×q(ab)}/{q(ab)+1}. Conversely, when the call has been placed and has not been determined to be the fraud, the determination unit 114 calculates {q(ab)+1}, and concurrently, determines {p(ab)+1} to be smaller than {p(ab)×q(ab)}/{q(ab)+1}.

Note that, q(ab) is calculated as follows. As has been described above, q(ab) corresponds to the probability of being evaluated as the fraud. Typically, a call is less likely to be evaluated as the fraud, and presumably in many cases, the number of trials of calculating the probability of being evaluated as the fraud is zero. In view of this, when the number of trials of calculating q(ab) is small, or when an initial value of q(ab) is calculated, q(ab) is calculated based on the probability q related to the other senders. For example, the determination unit 114 calculates $q(ab)_0$ as the initial value of q(ab), by the equation: $q(ab)_0$={total number of the evaluations related to the sender as the fraud}/{total number of the calls received from the sender and the other senders}.

Similarly, with regard to p(ab), when the number of calculation trials is small, or when the initial value for q(ab) is calculated, p(ab) is calculated based on a penalty value related to the other receivers of the calls. For example, the determination unit 114 calculates $p(ab)_0$ as the initial value of p(ab) by the equation: $p(ab)_0$=(average of the penalty values).

Additionally, when the calls are classified into the fraud call and the spam call, the determination unit 114 determines PW(ab) and PT(ab) satisfying {QW(ab)×PW(ab)+QT(ab)×PT(ab)}>R(ab), where R(ab) represents the sum of income expected from each of the fraud calls, RT (ab) represents the sum of income expected from each of the spam calls, QW(ab) represents the probability of being evaluated as the fraud, QT(ab) represents the probability of being evaluated as the spam, PW(ab) represents the sum of billing (penalty) when the call is evaluated as the fraud, and PT(ab) represents the sum of billing (penalty) when the call is evaluated as the spam. More specifically, as in the case in which the calls are not classified into the fraud call and the spam call, the determination unit 114 increases {QW(ab)×PW(ab)} when the call has been placed and has been determined to be the fraud, and increases {QT(ab)×PT(ab)} when the call has been placed and has been determined to be the spam. Conversely, the determination unit 114 decreases {QW(ab)×PW(ab)} and {QT(ab)×PT(ab)} when the call has been placed and has not been determined to be the fraud or the spam.

Method for Determining Sum of Billing 2 The determination unit 114 determines, as the sum of billing, a different sum of money between the case where the call from the sender has been evaluated as the spam in the evaluation result and the case where the call from the sender has been evaluated as the fraud in the evaluation result.

For example, the spam call prevention apparatus 11 causes the receiver to select whether the call from the sender is any one of the three options, i.e., "spam", "fraud (crime)", and "normal (not the spam or the fraud)". Then, the spam call prevention apparatus 11 determines a greater sum of money when the receiver selects the "fraud" than that when the receiver selects the "spam". The spam call prevention apparatus 11 sets in advance, in the storage unit 116, a sum of money in the case where the call is evaluated as the spam and a sum of money in the case where the call is evaluated as the fraud, these sums of money being different from each other. The determination unit 114 reads from the storage unit 116 the sum of money corresponding to each of the evaluations in the evaluation result from the receiver, and determines the sum of billing. Alternatively, only the sum of money for the spam may be set in the storage unit 116, and when the call is evaluated as the spam, the determination unit 114 may determine, as the sum of billing, the sum of money 1.5 times larger than the sum of money for the spam.

Method for Determining Sum of Billing 3

The determination unit 114 performs a risk analysis related to the ID of the sender through a statistical analysis based on the header information or others included in the request for communication that has been sent from the phone terminal 12 at the sender end, and determines the sum of billing based on an analysis result of the risk analysis.

For example, based on the evaluation results from the receivers, the processing unit 113 calculates, for each sender ID and for each receiver ID, the total number of each of the evaluations as the spam, the fraud, and the normal. Then, with respect to the sender of the call, when a ratio of the total number of the evaluations as the spam or the fraud to the total number of the evaluations as the normal is equal to or greater than a threshold, the determination unit 114 determines that the sender has a higher risk. When the ratio is smaller than the threshold, the determination unit 114 determines that the sender has a lower risk. Subsequently, the determination unit 114 determines a higher sum of money when the sender has the higher risk, and determines a lower sum of money when the sender has the lower risk.

Note that, in addition to the ID of each of the senders, the ID of each of the receivers and others are included in the header information. With regard to the statistical analysis and the risk analysis, in addition to the example described above, a method described in the document below is applicable: "H. TU, and three others," SoK: Everyone Hates Robocalls: a Survey of Techniques against Telephone Spam ", 2016 IEEE Symposium on Security and Privacy, pp. 320-338, <URL: https://oaklandsok.github.io/papers/tu2016.pdf>.

Method for Determining Sum of Billing 4

In a case where calls from the sender are evaluated as the spam, the fraud, or the normal by a plurality of receivers, the determination unit 114 determines, as the sum of billing, a sum of money corresponding to an evaluation tendency of each of the plurality of receivers. In other words, the determination unit 114 performs the statistical analysis of the evaluations where each of the receivers has evaluated calls as the spam, the fraud, or the normal; and based on the statistical analysis of the evaluations from each of the receivers, the determination unit 114 determines the sum of billing taking the evaluation tendency into account, such as a tendency for a receiver to evaluate each call as the spam or a tendency for a receiver to evaluate each call as the fraud".

For example, when the receiver receives the request for communication from the sender, who has previously placed a call to the receiver and has been determined to be the fraud in the evaluation result from the receiver, the determination unit 114 determines a different sum of billing in accordance with the receiver as follows. In a case where the receiver seldom evaluates each call as the fraud but evaluates this particular call as the fraud, the determination unit 114 determines the sum of money to be greater than the sum of money in a case where the receiver tends to evaluate any call as the fraud. In other words, the determination unit 114 determines a lower sum of money when the receiver tends to evaluate any call as the fraud, and determines a higher sum of money when the receiver seldom evaluates each call as the fraud but evaluates this particular call as the fraud.

Method for Determining Sum of Billing 5

The determination unit 114 determines the sum of billing by taking into account the state of the damage to the receiver caused by the fraud. In other words, the determination unit 114 determines the sum of billing by taking into account the sum of income (=r) expected from each of the spam calls or the fraud calls directed to each of the receivers.

For example, in the spam call prevention apparatus 11, a sum of income expected (expected value of the income) for the sender from each of the spam calls or the fraud calls, which is different for each of the receivers, is set in the storage unit 116 in advance. Subsequently, the determination unit 114 reads, from the storage unit 116, the sum of income for the sender in correspondence with the receiver that has sent the evaluation result, and determines the sum of billing. Note that, the sum of income expected for the sender from each of the spam calls or the fraud calls, which is different for each of the receivers, is predetermined based on, for example, a region, an income, or others of the corresponding receiver.

Method for Determining Sum of Billing 6

The determination unit 114 determines the sum of billing corresponding to the cost of issuing the ID (phone number) associated with the phone terminal of the sender of the call. In other words, in the risk analysis of the ID of the sender, the determination unit 114 identifies an initial value of the risk related to the ID of the sender by taking the cost of issuing the ID into account, and determines the initial value as the sum of billing.

Typically, when the ID of the phone terminal of the fraudster or a criminal (ID of the sender of the call) has been badly or poorly evaluated as the spam or the fraud, the fraudster or the criminal tends, as a countermeasure, to cancel the ID of the sender that has been badly or poorly evaluated, and reissue an ID of the sender. However, when the cost of issuing the ID is higher, the fraud or the criminal is presumed not to reissue the ID easily.

Thus, when the cost of issuing the ID of the sender included in the request for communication is higher, the determination unit 114 determines that the ID of the sender has the lower risk; and when the cost of issuing the ID of the sender is lower, the determination unit 114 determines that the ID of the sender has a higher risk. Here, the determination unit 114 determines, as the sum of billing, the lower sum of money when the ID of the sender has the lower risk due to the higher cost of issuing the ID of the sender, and the determination unit 114 determines, as the sum of billing, the higher sum of money when the ID of the sender has the higher risk due to the lower cost of issuing the ID of the sender. Particularly, when the sender of the call is a new sender, information required to determine the sum of billing is not sufficient. In this case, the determination unit 114 extracts a group of the senders having the higher sums of billing, obtains an average value of the sums of billing related to the group of the senders extracted, and obtain a value by subtracting, from the average value, the cost of issuing the ID of the new sender. Then, the determination unit 114 determines the value as the initial value of the sum of billing.

Note that, the cost of issuing the ID corresponds to an initial cost required to issue the phone number (contract fee, facility installation cost, and construction cost). In a case of a corporate contract, the phone number is required to be registered, and thus, in addition to the initial cost, the registration cost is included in the cost of issuing the ID. In the spam call prevention apparatus 11, the storage unit 116 may previously store the cost of issuing the ID of each of the senders, or the cost of issuing the ID of each of the senders may be acquired from a management server of the phone company whenever the request for communication is transmitted from the phone terminal 12 of the corresponding sender.

Method for Determining Sum of Billing 7

The determination unit 114 determines, as the sum of billing, a sum of money determined by the receiver of the call, regardless of the methods of determining the sum of billing 1 to 6.

For example, the spam call prevention apparatus 11 causes the receiver to return the evaluation result of evaluating the call, and concurrently, to input the sum of money. The determination unit 114 respects an intention of the receiver, and simply determines the sum of money inputted by the receiver as the sum of billing. In this state, the determination unit 114 may determine, as the sum of billing, an average value of the sums of billing inputted by the plurality of receivers. Alternatively, the determination unit 114 may multiply the sum of money, which has been inputted by each of the plurality of receivers at each of the timings, by a predetermined weight or others in accordance with an input tendency of the corresponding receiver, and obtain a value multiplied. Then, the determination unit 114 may determine, as the sum of billing, an average value of the total of the values multiplied.

Effect

A spam call prevention apparatus 11 according to this embodiment includes:

a response unit 111 configured to convey, to a phone terminal of a sender of a call, a response that, in a case where the call from the sender is evaluated as a spam or a fraud by a receiver of the call, the sender is billed a sum of money corresponding to a probability of being evaluated as the spam or the fraud;

a notification unit 112 configured to notify, when the sender has requested, in responding to the response, the call to the receiver, a phone terminal of the receiver of a request for returning an evaluation result of evaluating the call from the sender after the call between the sender and the receiver has ended; and a determination unit 114 configured to determine, when the call from the sender has been evaluated as the spam or the fraud in the evaluation result, the sum of money corresponding to the probability of being evaluated as the spam or the fraud, as a sum of billing. Accordingly, this embodiment provides a technique configured to prevent spam calls or fraud calls.

In this embodiment, the determination unit 114 determines, as the sum of billing, p satisfying a relationship of (p×q)>r, where q represents the probability of being evaluated as the spam or the fraud, p represents the sum of money corresponding to the probability of being evaluated as the spam or the fraud, and r represents a sum of income expected from a spam call or a fraud call. Accordingly, this embodiment provides the technique configured to more reliably prevent spam calls or fraud calls.

In this embodiment, the determination unit 114 determines, as the sum of billing, a different sum of money between a case where the call from the sender has been evaluated as the spam in the evaluation result and a case where the call from the sender has been evaluated as the fraud in the evaluation result. Accordingly, this embodiment provides the technique configured to more reliably prevent spam calls or fraud calls.

In this embodiment, in a case where calls from the sender are evaluated as the spam, the fraud, or a normal by a plurality of receivers, the determination unit 114 determines, as the sum of billing, a sum of money corresponding to an evaluation tendency of each of the plurality of receivers of the calls. Accordingly, this embodiment provides the technique configured to more reliably prevent spam calls or fraud calls.

In this embodiment, the determination unit 114 determines, as the sum of billing, a sum of money corresponding to a cost of issuing an ID associated with the phone terminal of the sender. Accordingly, this embodiment provides the technique configured to more reliably prevent spam calls or fraud calls.

Others

The present invention is not limited to the foregoing embodiment, and various modifications may be made within the scope of the gist of the present invention. For example, the sum of billing may be determined based on combination of two or more of the methods of determining the sum of billing 1 to 7.

Figure 4:
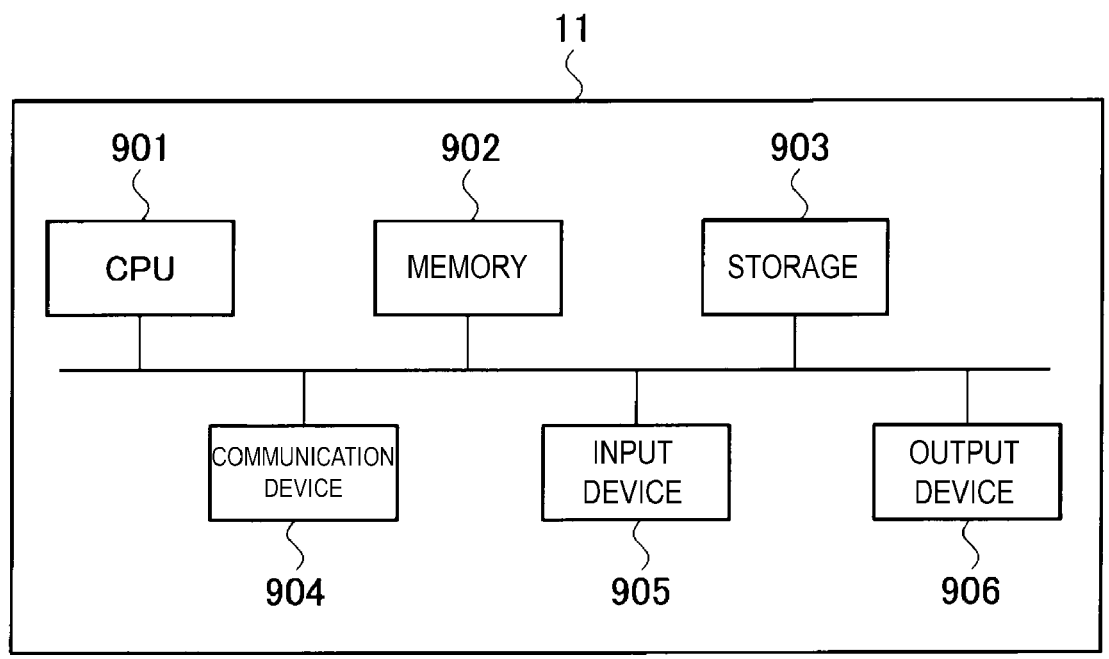
FIG. 4 is a diagram illustrating a hardware configuration of the spam call prevention apparatus.

As the spam call prevention apparatus 11 described in this embodiment, a computer system for general use may be used, which includes a central processing unit (CPU) 901, a memory 902, a storage 903, e.g., a hard disk drive (HDD) or a solid state drive (SDD), a communication device 904, an input device 905, and an output device 906, as illustrated in FIG. 4. The memory 902 and the storage 903 are storage devices. In the computer system, the CPU 901 executes a predetermined program loaded in the memory 902, thereby implementing the functions of the spam call prevention apparatus 11.

The spam call prevention apparatus 11 may be implemented by a single computer or may be implemented by a plurality of computers. Alternatively, the spam call prevention apparatus 11 may be a virtual machine implemented by a computer. The program for the spam call prevention apparatus 11 may be stored in a computer-readable storage medium such as the HDD, the SSD, a universal serial bus (USB) memory, a compact disc (CD), or a digital versatile disc (DVD), or alternatively, may be distributed via the network.

REFERENCE SIGNS LIST

1: Spam call prevention system
11: Spam call prevention apparatus
12: Phone terminal at sender end
13: SIP server at sender end
14: Phone terminal at receiver end
15: SIP server at receiver end
111: Response unit
112: Notification unit
113: Processing unit
114: Determination unit
115: Transmission unit
116: Storage unit 901 CPU
902 Memory
903 Storage
904 Communication device
905 Input device
906 Output device

The invention claimed is:

1. A spam call prevention apparatus comprising:
a response unit, including one or more processors, configured to convey, to a phone terminal of a sender of a call, a response that, in a case where the call from the sender is evaluated as a spam or a fraud by a receiver of the call, the sender is billed a sum of money corresponding to a probability of being evaluated as the spam or the fraud;
a notification unit, including one or more processors, configured to notify, when the sender has requested, in responding to the response, the call to the receiver, a phone terminal of the receiver of a request for returning an evaluation result of evaluating the call from the sender after the call between the sender and the receiver has ended; and
a determination unit, including one or more processors, configured to determine, when the call from the sender has been evaluated as the spam or the fraud in the evaluation result, the sum of money corresponding to the probability of being evaluated as the spam or the fraud, as a sum of billing.

2. The spam call prevention apparatus according to claim 1, wherein
the determination unit is configured to determine, as the sum of billing, p satisfying a relationship of $(p \times q) > r$, where q represents the probability of being evaluated as the spam or the fraud, p represents the sum of money corresponding to the probability of being evaluated as the spam or the fraud, and r represents a sum of income expected from a spam call or a fraud call.

3. The spam call prevention apparatus according to claim 1, wherein
the determination unit is configured to determine, as the sum of billing, a different sum of money between a case where the call from the sender has been evaluated as the spam in the evaluation result and a case where the call from the sender has been evaluated as the fraud in the evaluation result.

4. The spam call prevention apparatus according to claim 1, wherein
in a case where calls from the sender are evaluated as the spam, the fraud, or a normal by a plurality of receivers of the calls, the determination unit is configured to determine, as the sum of billing, a sum of money corresponding to an evaluation tendency of each of the plurality of receivers.

5. The spam call prevention apparatus according to claim 1, wherein
the determination unit is configured to determine, as the sum of billing, a sum of money corresponding to a cost of issuing an ID associated with the phone terminal of the sender.

6. A spam call prevention method performed by a spam call prevention apparatus, the spam call prevention method comprising:
by the spam call prevention apparatus, conveying, to a phone terminal of a sender of a call, a response that, in a case where the call from the sender is evaluated as a spam or a fraud by a receiver of the call, the sender is billed a sum of money corresponding to a probability of being evaluated as the spam or the fraud;

by the spam call prevention apparatus, notifying, when the sender has requested, in responding to the response, the call to the receiver, a phone terminal of the receiver of a request for returning an evaluation result of evaluating the call from the sender after the call between the sender and the receiver has ended; and by the spam call prevention apparatus, determining, when the call from the sender has been evaluated as the spam or the fraud in the evaluation result, the sum of money corresponding to the probability of being evaluated as the spam or the fraud, as a sum of billing.

7. A non-transitory computer readable medium storing one or more instructions causing a computer to execute:

by a spam call prevention apparatus, conveying, to a phone terminal of a sender of a call, a response that, in a case where the call from the sender is evaluated as a spam or a fraud by a receiver of the call, the sender is billed a sum of money corresponding to a probability of being evaluated as the spam or the fraud;

by the spam call prevention apparatus, notifying, when the sender has requested, in responding to the response, the call to the receiver, a phone terminal of the receiver of a request for returning an evaluation result of evaluating the call from the sender after the call between the sender and the receiver has ended; and by the spam call prevention apparatus, determining, when the call from the sender has been evaluated as the spam or the fraud in the evaluation result, the sum of money corresponding to the probability of being evaluated as the spam or the fraud, as a sum of billing.

8. The spam call prevention method according to claim 6, further comprising:

determining, as the sum of billing, p satisfying a relationship of $(p \times q) > r$, where q represents the probability of being evaluated as the spam or the fraud, p represents the sum of money corresponding to the probability of being evaluated as the spam or the fraud, and r represents a sum of income expected from a spam call or a fraud call.

9. The spam call prevention method according to claim 6, further comprising:

determining, as the sum of billing, a different sum of money between a case where the call from the sender has been evaluated as the spam in the evaluation result and a case where the call from the sender has been evaluated as the fraud in the evaluation result.

10. The spam call prevention method according to claim 6, further comprising:

in a case where calls from the sender are evaluated as the spam, the fraud, or a normal by a plurality of receivers of the calls, determining, as the sum of billing, a sum of money corresponding to an evaluation tendency of each of the plurality of receivers.

11. The spam call prevention method according to claim 6, further comprising:

determining, as the sum of billing, a sum of money corresponding to a cost of issuing an ID associated with the phone terminal of the sender.

12. The non-transitory computer readable medium according to claim 7, further comprising:

determining, as the sum of billing, p satisfying a relationship of $(p \times q) > r$, where q represents the probability of being evaluated as the spam or the fraud, p represents the sum of money corresponding to the probability of being evaluated as the spam or the fraud, and r represents a sum of income expected from a spam call or a fraud call.

13. The non-transitory computer readable medium according to claim 7, further comprising:

determining, as the sum of billing, a different sum of money between a case where the call from the sender has been evaluated as the spam in the evaluation result and a case where the call from the sender has been evaluated as the fraud in the evaluation result.

14. The non-transitory computer readable medium according to claim 7, further comprising:

in a case where calls from the sender are evaluated as the spam, the fraud, or a normal by a plurality of receivers of the calls, determining, as the sum of billing, a sum of money corresponding to an evaluation tendency of each of the plurality of receivers.

15. The non-transitory computer readable medium according to claim 7, further comprising:

determining, as the sum of billing, a sum of money corresponding to a cost of issuing an ID associated with the phone terminal of the sender.

* * * * *